(12) United States Patent
Brunner

(10) Patent No.: US 6,338,202 B1
(45) Date of Patent: Jan. 15, 2002

(54) MEASUREMENT TOOL USED WITH AN INDICATOR

(76) Inventor: Thomas B. Brunner, 5613 Betty La., Milford, OH (US) 45150

(*) Notice: Subject to any disclaimer, the term of this patent is extended or adjusted under 35 U.S.C. 154(b) by 0 days.

(21) Appl. No.: 09/484,468

(22) Filed: Jan. 14, 2000

(51) Int. Cl.[7] .................................................. G01B 5/28
(52) U.S. Cl. ............................ 33/544; 33/832; 33/553
(58) Field of Search ......................... 33/544, 712, 832, 33/833, 542, 544.1, 544.2, 544.3, 549, 551, 553, 554, 555

(56) References Cited

U.S. PATENT DOCUMENTS

| 1,806,893 A | | 5/1931 | Cunningham | |
|---|---|---|---|---|
| 1,858,544 A | * | 5/1932 | Erickeon | ...................... 33/544 |
| 2,062,961 A | | 12/1936 | Bauer et al. | |
| 2,199,236 A | | 4/1940 | Bigwood | |
| 2,456,497 A | | 12/1948 | Forsmark | |
| 2,680,913 A | * | 6/1954 | Johnson et al. | ............. 33/544.2 |
| 3,128,559 A | * | 4/1964 | Winter | ......................... 33/544 |
| D252,501 S | | 7/1979 | Yamauchi et al. | |
| 4,809,440 A | | 3/1989 | Rutter | |
| 5,226,240 A | * | 7/1993 | Stark | ............................ 33/542 |
| 5,497,560 A | * | 3/1996 | Pasquerella et al. | ........... 33/832 |

\* cited by examiner

*Primary Examiner*—Christopher W. Fulton

(57) ABSTRACT

A measurement tool used with an indicator for simplfying the task of measuring a hard-to-reach surface of an object. The measurement tool used with an indicator includes a cylindrical member having a first and a second end and a bore extending therethrough and a first longitudinal slot and a second longitudinal slot; and also includes a shaft moveably disposed in the bore and having a collar securely attached thereabout to limit the movement of the shaft in the bore; and further includes a linkage member pivotally attached to the shaft and moveably disposed in the first longitudinal slot and being pivotally attached to an arm member; and further includes a fastening member securely mounted to the cylindrical member for tightly securing the indicator in the cylindrical member with the shaft being in contactable relationship with the indicator.

20 Claims, 4 Drawing Sheets

MEASUREMENT TOOL USED WITH AN INDICATOR

BACKGROUND OF THE INVENTION

1. Field of the Invention

The present invention relates to a measuring attachment for an indicator and more particularly pertains to a new measurement tool used with a dow indicator for simplifying the task of measuring a hard-to-reach surface of an object.

2. Description of the Prior Art

The use of measuring attachment for an indicator is known in the prior art. More specifically, measuring attachment for an indicator heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,062,961; U.S. Pat. No. 2,199,236; U.S. Pat. No. 2,456,497; U.S. Pat. No. 1,806,893; U.S. Pat. No. 4,809,440; and U.S. Pat. No. Des. 252,501.

While these devices fulfill their respective, particular objectives and requirements, the aforementioned patents do not disclose a new measurement tool used with an indicator. The inventive device includes a cylindrical member having a first and a second end and a bore extending therethrough and a first longitudinal slot and a second longitudinal slot; and also includes a shaft moveably disposed in the bore and having a collar securely attached thereabout to limit the movement of the shaft in the bore; and further includes a linkage member pivotally attached to the shaft and moveably disposed in the first longitudinal slot and being pivotally attached to an arm member; and further includes a fastening member securely mounted to the cylindrical member for tightly securing the indicator in the cylindrical member with the shaft being in contactable relationship with the indicator.

In these respects, the measurement tool used with an indicator according to the present invention substantially departs from the conventional concepts and designs of the prior art, and in so doing provides an apparatus primarily developed for the purpose of simplifying the task of measuring a hard-to-reach surface of an object.

SUMMARY OF THE INVENTION

In view of the foregoing disadvantages inherent in the known types of measuring attachment for an indicator now present in the prior art, the present invention provides a new measurement tool used with an indicator construction wherein the same can be utilized for simplfying the task of measuring a hard-to-reach surface of an object.

The general purpose of the present invention, which will be described subsequently in greater detail, is to provide a new measurement tool used with an indicator which has many of the advantages of the measuring attachment for an indicator mentioned heretofore and many novel features that result in a new measurement tool used with an indicator which is not anticipated, rendered obvious, suggested, or even implied by any of the prior art measuring attachment for an indicator, either alone or in any combination thereof.

To attain this, the present invention generally comprises a cylindrical member having a first and a second end and a bore extending therethrough and a first longitudinal slot and a second longitudinal slot; and also includes a shaft moveably disposed in the bore and having a collar securely attached thereabout to limit the movement of the shaft in the bore; and further includes a linkage member pivotally attached to the shaft and moveably disposed in the first longitudinal slot and being pivotally attached to an arm member; and further includes a fastening member securely mounted to the cylindrical member for tightly securing the indicator in the cylindrical member with the shaft being in contactable relationship with the indicator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new measurement tool used with an indicator which has many of the advantages of the measuring attachment for an indicator mentioned heretofore and many novel features that result in a new measurement tool used with an indicator which is not anticipated, rendered obvious, suggested, or even implied by any of the prior art measuring attachment for an indicator, either alone or in any combination thereof.

It is another object of the present invention to provide a new measurement tool used with an indicator which may be easily and efficiently manufactured and marketed.

It is a further object of the present invention to provide a new measurement tool used with an indicator which is of a durable and reliable construction.

An even further object of the present invention is to provide a new measurement tool used with an indicator which is susceptible of a low cost of manufacture with regard to both materials and labor, and which accordingly is then susceptible of low prices of sale to the consuming public, thereby making such measurement tool used with an indicator economically available to the buying public.

Still yet another object of the present invention is to provide a new measurement tool used with an indicator which provides in the apparatuses and methods of the prior art some of the advantages thereof, while simultaneously overcoming some of the disadvantages normally associated therewith.

Still another object of the present invention is to provide a new measurement tool used with an indicator for simplifying the task of measuring a hard-to-reach surface of an object.

Yet another object of the present invention is to provide a new measurement tool used with an indicator which includes a cylindrical member having a first and a second end and a bore extending therethrough and a first longitudinal slot and a second longitudinal slot; and also includes a shaft moveably disposed in the bore and having a collar securely attached thereabout to limit the movement of the shaft in the bore; and further includes a linkage member pivotally attached to the shaft and moveably disposed in the first longitudinal slot and being pivotally attached to an arm member; and further includes a fastening member securely mounted to the cylindrical member for tightly securing the indicator in the cylindrical member with the shaft being in contactable relationship with the indicator.

Still yet another object of the present invention is to provide a new measurement tool used with an indicator that allows users to quickly and conveniently measure surfaces of objects.

Even still another object of the present invention is to provide a new measurement tool used with an indicator that eliminates the need to use a tape measure to measure the hard-to-reach surfaces of objects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
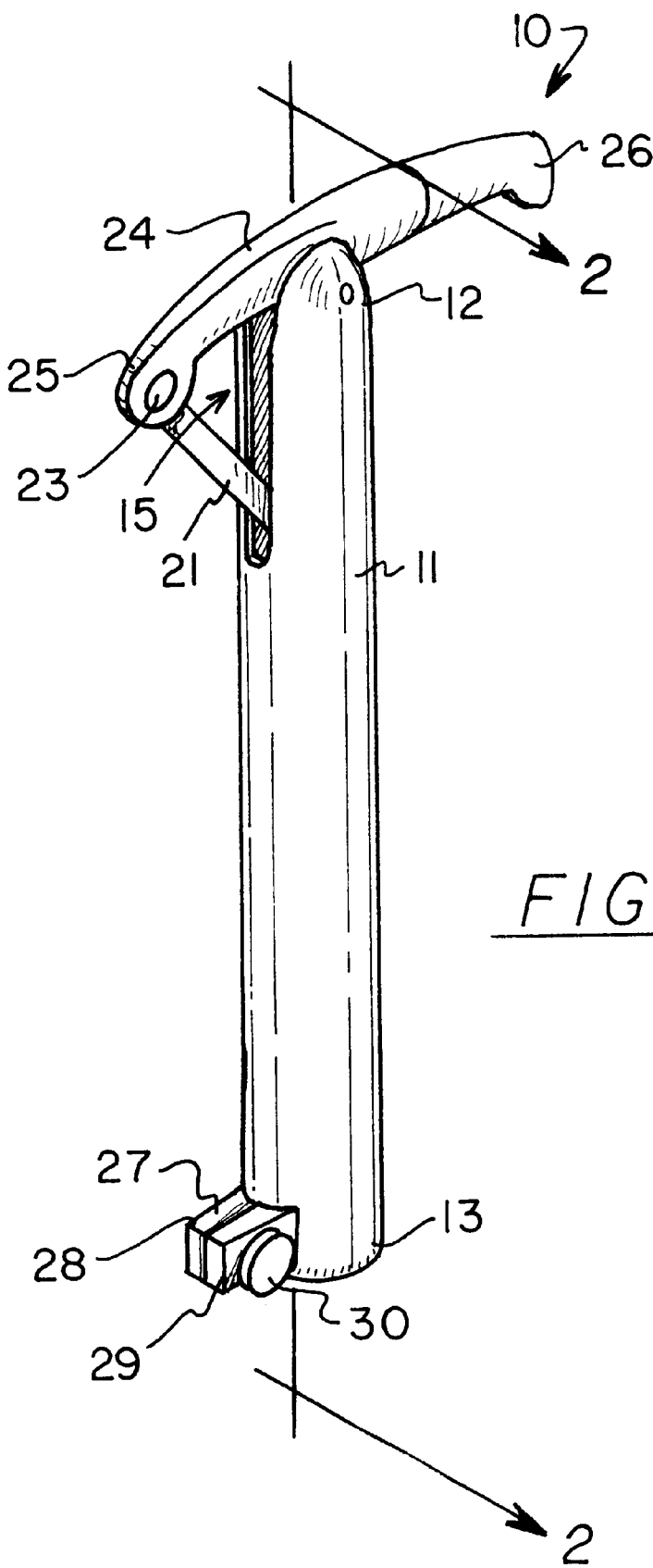
FIG. 1 is a perspective view of a new measurement tool used with an indicator according to the present invention.
Figure 2:
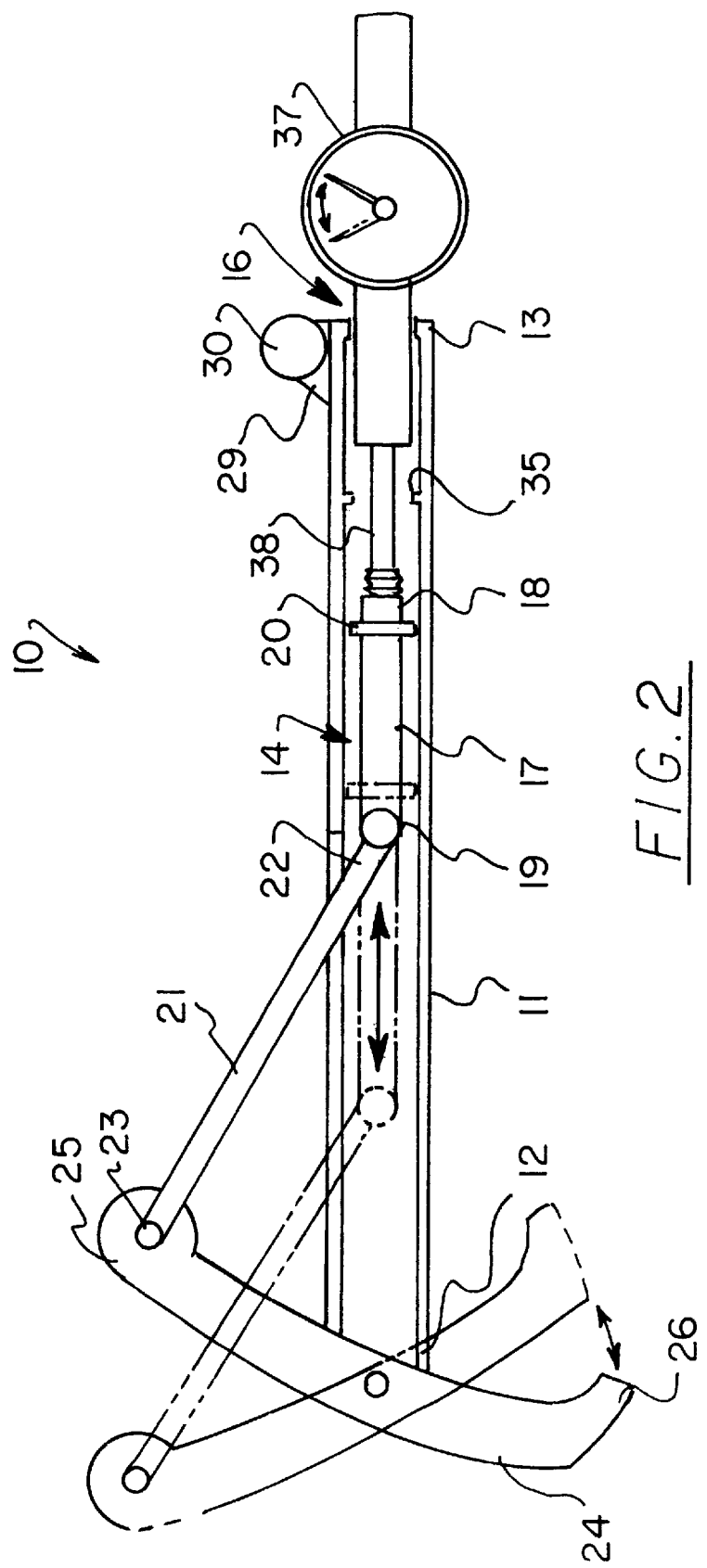
FIG. 2 is a side cross-sectional view of the present invention.
Figure 3:
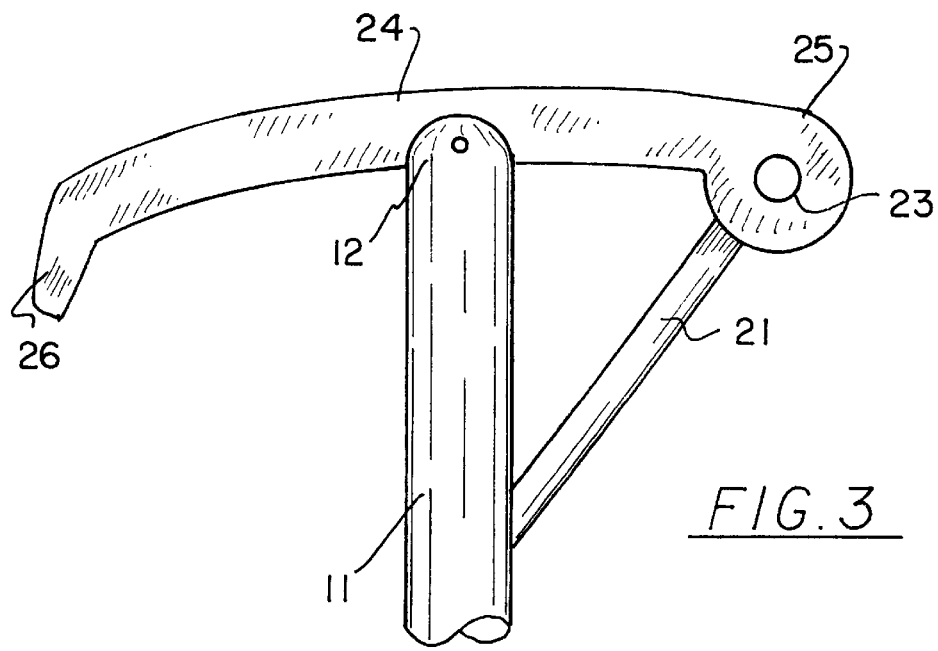
FIG. 3 is a detailed side elevational view of the arm member of the present invention.
Figure 4:
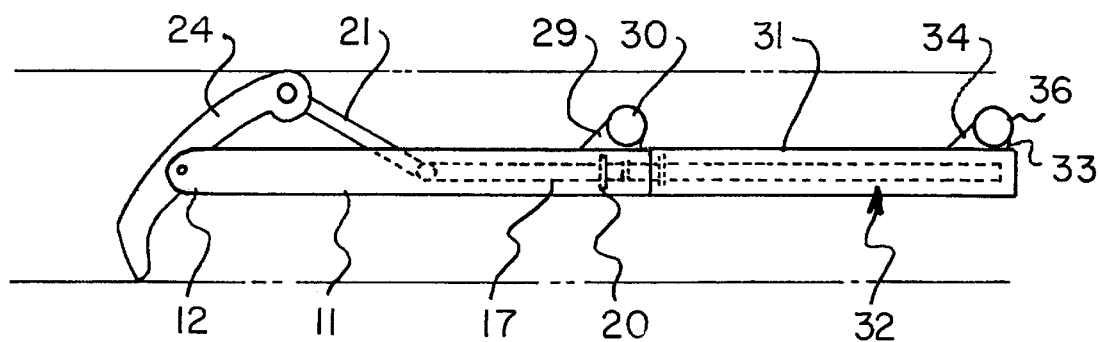
FIG. 4 is a side elevational view of the extension member being connected to the cylindrical member of the present invention.
Figure 5:
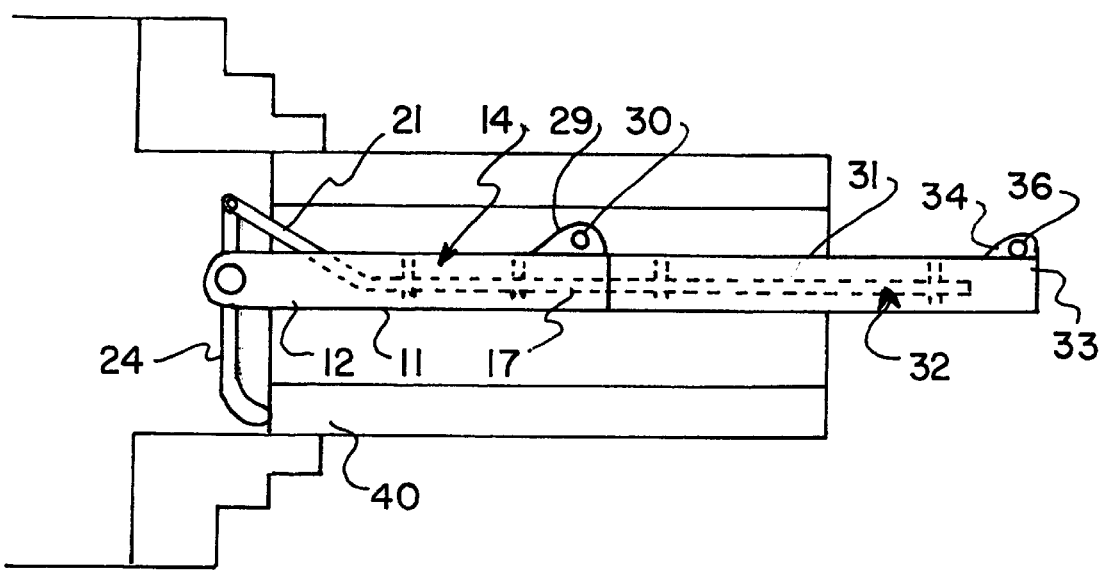
FIG. 5 is a side elevational view of the mesurement tool being used.

With reference now to the drawings, and in particular to FIGS. 1 through 5 thereof, a new measurement tool used with an indicator embodying the principles and concepts of the present invention and generally designated by the reference numeral 10 will be described.

As best illustrated in FIGS. 1 through 5, the measurement tool 10 is highly suitable for use with an indicator 37, and is most preferably used with a dial indicator. The measurment tool 10 generally comprises a cylindrical member 11 having a first end 12 and a second end 13 and a bore extending 14 therethrough and a first longitudinal slot 15 extending from the first end 12 and a second longitudinal slot 16 at the second end 13. The first longitudinal slot 15 terminates intermediately of the cylindrical member 11. The cylindrical member 11 also includes a flange 35 securely and integrally attached to the interior of the wall of the cylindrical member 11 inside the bore 14 near the second end 13 thereof and has a length ranging from approximately 6 inches to 24 inches with the bore 14 having a diameter of approximately ⅝ inch. A means for taking measurements of a surface includes a shaft 17 slidably disposed within the bore 14 of the cylindrical member 11 and having a first end 18 and a second end 19 and being adapted to be in contactable relationship with the indicator 37; and further includes a linkage member 21 having a first end 22 pivotally attached to the shaft 17 and also having a second end 23; and also includes an arm member 24 being pivotally and conventionally attached at the first end 12 of the cylindrical member 11 and having a first end 25 pivotally and conventionally connected to the second end 23 of the linkage member 21 and also having a second end 26 for measuring a surface of an object. The shaft 17 includes a collar 20 securely disposed thereabout near the first end 18 thereof and being capable of coming into contact with the flange 35 for limiting movement of the shaft 17 within the bore 14. The first end 18 of the shaft 17 includes a seat adapted to be in contactable relationship with a probe 38 of the indicator 37. The first end 22 of the linkage member 21 is pivotally and conventionally connected to the second end 19 of the shaft 17. The linkage member 21 is moveably received in the first longitudinal slot 15. The arm member 24 has a central portion which extends in the bore 14 through the first end 12 of the cylindrical member 11. The second end 26 of the arm member 24 is adapted to move and measure a deflecting distance of a surface of an object being measured in thousandths of an inch. The shaft 17 is slidable in relationship to movement of the second end 26 of the arm member 24 and is adapted to translate the movement to the indicator 37 in thousandths of an inch. A fastening member 27 is securely and conventionally attached to the second end 13 and is adapted to secure the indicator 37 in the cylindrical member 11 through the second end 13 thereof. The fastening member 27 includes a pair of brackets 28, 29 securely attached and welded on opposite sides of the second longitudinal slot 16 and also includes a fastener 30 threaded through the brackets 28, 29 to securely tighten the second end 13 of the cylindrical member 11 about a portion of the indicator 37.

As a second embodiment, the measurement tool includes an extension member 31 having a bore 32 extending therethrough and further having a first end which is fastenable to the second end 13 of the cylindrical member 11; and also includes a clamping member 33 having bracket members 34 and a securing member 36 threaded through the bracket members 34 and being securely mounted at a second end of the extension member 31. The indicator 37 would be securely inserted in the second end of the extension member 31.

In use, the user secures the indicator 37 in the second end 13 of the cylindrical member 11 and secures the measurement tool 10 in a lathe or a vice and extends the measurement tool 10 inside an object 40 to be measured and allows the arm member 24 to rest upon the surface inside the object 40 and moves or rotates the object 40; whereupon the arm member 24 will pivot thus moving the shaft 17 which translates the measurement of the particular surface in thousandths of an inch to the indicator 37.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A measurement tool for use with an indicator comprising:
   a tubular member having a first end and a second end and a bore extending therethrough, a first longitudinal slot extending from said first end and a second longitudinal slot at said second end, said second end of said tubular member being adapted to receive a portion of the indicator; and
   a means for taking measurements of a surface including:
      a shaft slidably disposed in said bore of said tubular member, said shaft having a first end and a second end, said shaft being adapted to contact an indicator when the indicator is mounted on said tubular member;
      a linkage member having a first end pivotally attached to said shaft and also having a second end; and
      an arm member pivotally attached to said first end of said tubular member, said arm member having a first end pivotally connected to said second end of said linkage member and also having a second end for contacting a surface of an object to be measured.

2. A measurement tool as described in claim 1, wherein said first longitudinal slot terminates intermediately of said tubular member, said tubular member further including a flange securely attached to an interior of a wall of said tubular member; and wherein said shaft includes a collar disposed thereabout and being capable of coming into contact with said flange for limiting movement of said shaft in said bore.

3. A measurement tool as described in claim 1, wherein said first end of said shaft includes a seat adapted to be in contactable relationship with a probe of the indicator.

4. A measurement tool as described in claim 1, wherein said first end of said linkage member is pivotally connected to said second end of said shaft.

5. A measurement tool as described in claim 1, wherein said linkage member is moveably received in said first longitudinal slot.

6. A measurement tool as described in claim 1, wherein said arm member has a central portion which extends in said bore through said first end of said tubular member.

7. A measurement tool as described in claim 1, wherein said second end of said arm member is adapted to move and measure a deflection of a surface of an object being measured.

8. A measurement tool as described in claim 1, additionally comprising a fastening member attached to said second end of said tubular member and being adapted to secure a portion of an indicator to said tubular member.

9. A measurement tool as described in claim 8, wherein said fastening member includes a pair of brackets attached on opposite sides of said second longitudinal slot and also includes a fastener threaded through said brackets to tighten said second end of said tubular member about a portion of the indicator.

10. A measurement tool as described in claim 1, further includes an extension member having a bore extending therethrough and further having a second end which is adapted to receive the indicator and also having a first end which is fastenable to said second end of said tubular member; and also includes a clamping member mounted at said second end of said extension member and including bracket members and a securing member threaded therethrough for tightly securing the indicator.

11. A measurement tool for use with an indicator, comprising:
   a tubular member having a first end and a second end and a bore extending therethrough and a first longitudinal slot extending from said first end and a second longitudinal slot at said second end;
   a means for taking measurements of a surface; and
   a fastening member securely attached to said second end and being adapted to secure an indicator in said tubular member;
   wherein said first longitudinal slot terminates intermediately of said tubular member, said cylindrical member further including a flange securely attached to an interior of a wall of said tubular member;
   wherein said means for taking measurements of a surface includes a shaft slidably disposed within said bore of said tubular member and having a first end and a second end and being adapted to be in contactable relationship with the indicator; and further includes a linkage member having a first end pivotally attached to said shaft and also having a second end; and also includes an arm member being pivotally attached at said first end of said tubular member and having a first end pivotally connected to said second end of said linkage member and also having a second end for measuring a surface of an object:
   wherein said shaft includes a collar securely disposed thereabout near said first end thereof and being capable of coming into contact with said flange for limiting movement of said shaft within said bore.

12. A measurement tool as described in claim 11, wherein said first end of said shaft includes a seat adapted to be in contactable relationship with a probe of the indicator.

13. A measurement tool as described in claim 11, wherein said first end of said linkage member is pivotally connected to said second end of said shaft.

14. A measurement tool as described in claim 11, wherein said linkage member is moveably received in said first longitudinal slot.

15. A measurement tool as described in claim 11, wherein said arm member has a central portion which extends in said bore through said first end of said tubular member.

16. A measurement tool as described in claim 11, wherein said second end of said arm member is adapted to move and measure a deflection of a surface of an object being measured.

17. A measurement tool as described in claim 11, wherein said fastening member includes a pair of brackets attached on opposite sides of said second longitudinal slot and also includes a fastener threaded through said brackets to tighten said second end of said tubular member about a portion of the indicator.

18. A measurement tool as described in claim 17, further includes an extension member having a bore extending therethrough and further having a second end which is adapted to receive the indicator and also having a first end which is fastenable to said second end of said tubular member; and also includes a clamping member mounted at said second end of said extension member and including bracket members and a securing member threaded therethrough for tightly securing the indicator.

19. A measurement tool for use with an indicator comprising:

a cylindrical member having a first end and a second end and a bore extending therethrough and a first longitudinal slot extending from said first end and a second longitudinal slot at said second end, said first longitudinal slot terminates intermediately of said cylindrical member, said cylindrical member having a length ranging from approximately 6 inches to 24 inches, said bore having a diameter of approximately 5/8 inch, said cylindrical member further including a flange securely attached to an interior of a wall of said cylindrical member;

a means for taking measurements of a surface including a shaft slidably disposed within said bore of said cylindrical member and having a first end and a second end and being adapted to be in contactable relationship with the indicator; and further including a linkage member having a first end pivotally attached to said shaft and also having a second end; and also including an arm member being pivotally attached at said first end of said cylindrical member and having a first end pivotally connected to said second end of said linkage member and also having a second end for measuring a surface of an object, said shaft including a collar securely disposed thereabout near said first end thereof and being capable of coming into contact with said flange for limiting movement of said shaft within said bore, said first end of said shaft including a seat adapted to be in contactable relationship with a probe of the indicator, said first end of said linkage member being pivotally connected to said second end of said shaft, said linkage member being moveably received in said first longitudinal slot, said arm member having a central portion which extends in said bore through said first end of said cylindrical member, said second end of said arm member being adapted to move and measure a deflecting distance of a surface of an object being measured in thousandths of an inch, said shaft being slidable in relationship to movement of said second end of said arm member and being adapted to translate said movement to the indicator in thousandths of an inch; and a fastening member securely attached to said second end and being adapted to secure an indicator in said cylindrical member, said fastening member including a pair of brackets securely attached on opposite sides of said second longitudinal slot and also including a fastener threaded through said brackets to securely tighten said second end of said cylindrical member about a portion of the indicator.

20. A measurement tool as described in claim 19, further includes an extension member having a bore extending therethrough and further having a second end which is adapted to receive the indicator and also having a first end which is fastenable to said second end of said cylindrical member; and also includes a clamping member securely mounted at said second end of said extension member and including a bracket members and a securing member threaded therethrough for tightly securing the indicator.

* * * * *